UNITED STATES PATENT OFFICE.

HARRY B. COX, OF CINCINNATI, OHIO.

GALVANIC BATTERY.

SPECIFICATION forming part of Letters Patent No. 375,441, dated December 27, 1887.

Application filed May 5, 1887. Serial No. 237,256. (No specimens.)

*To all whom it may concern:*

Be it known that I, HARRY B. COX, of Cincinnati, in the county of Hamilton and State of Ohio, have invented certain new and useful Improvements in Electric Batteries; and I do hereby declare that the following is a full, clear, and exact description of the invention, which will enable others skilled in the art to which it appertains to make and use the same.

This invention relates to a new and useful battery-excitant and to the process of preparing the same.

The object of the invention is to produce an excitant for open-circuit batteries which will rapidly recover itself while resting, will resist the effects of ordinary temperatures, maintaining the electrodes in proper relative position, and prevent the dissemination of the soluble electrode throughout the body of the liquid.

To this end my invention consists in a certain novel composition and the process of preparing it, which will be hereinafter definitely indicated in the claims.

In putting my invention into practice I take a vegetable starchy material—Irish moss or any sea-moss I find to be well adapted for the purpose—and soak it in water, preferably cold, until it becomes softened by absorption, and let it soak until the starchy matter of the plant begins to ferment or sour. When it reaches this stage, I add a quantity of water, about equal in bulk to the soaked moss, and boil the whole for from fifteen to thirty minutes. The amount of water added may vary according to the desired consistency of the final product. After the boiling, add a quantity of sal-ammoniac or other salt of an alkali, sufficient to make the excitant a good electrolytic conductor and assist in the exciting action on the zinc, and subject the mass to further boiling. These repeated boilings serve to completely rupture all of the starch-cells of the plant and dissolve the gluten, while the fermentation probably assists in decomposing the cellulose. Stirring may accompany the boiling operations. The material becomes of a uniform pasty consistency and the sal-ammoniac is thoroughly incorporated and dissolved throughout the mass. The latter is poured into a receiving-vessel, and a small quantity of bisulphate of mercury is added. The latter improves the electrolyte by slightly acidulating the same, and keeps the zinc amalgamated. The mass is then allowed to cool, when it is packed in the battery-jar between and around the electrodes. It becomes of a comparatively-stiff pasty consistency, and preserves the electrodes in place, however much jarring the battery may be subjected to. In case a cell should crack or break there is no damage by the spilling of the electrolyte. The zinc salts formed by the action of the battery are not disseminated throughout the electrolyte, but are confined to the neighborhood of the zinc, being in course of usage deposited at the bottom of the zinc. From this action a comparatively-uniform resistance is maintained if the battery be properly sealed. While the battery is not in use, or is "resting," the hydrogen developed at the negative electrode seems to be absorbed by the mass, and finally escapes through the top of the cell, all of which will be particularly described in my application above referred to. This electrolyte resists low temperatures, a fact which adapts it well for out-of-door work. There is more or less fermentation going on during use, which preserves acidulation and tends to raise the electro-motive force.

Having thus described my invention, what I claim, and desire to secure by Letters Patent, is—

1. The herein-described process of preparing a battery-excitant, which consists in first soaking a starchy substance, then allowing the mass to stand and ferment, then finally boiling the same and adding the salt of an alkali.

2. A battery-excitant consisting of a boiled starchy matter containing the salt of an alkali dissolved therein, substantially as described.

3. A battery-excitant consisting of a starch paste containing the salt of an alkali and bisulphate of mercury in solution.

4. A battery-excitant consisting of a fermented paste of moss containing sal-ammoniac and bisulphate of mercury in solution, substantially as described.

In testimony that I claim the foregoing as my own I affix my signature in presence of two witnesses.

HARRY B. COX.

Witnesses:
CHARLES M. WERLE,
M. M. LAMMOND.